United States Patent [19]
Prejean

[11] Patent Number: 5,484,847
[45] Date of Patent: Jan. 16, 1996

[54] MOISTURE-CURABLE MELT-PROCESSIBLE ETHYLENE GRAFT COPOLYMERS

[75] Inventor: George W. Prejean, Orange, Tex.

[73] Assignee: E. I. Du Pont de Nemours and Company, Wilmington, Del.

[21] Appl. No.: 378,429

[22] Filed: Jan. 26, 1995

Related U.S. Application Data

[63] Continuation-in-part of Ser. No. 252,292, Jun. 1, 1994, Pat. No. 5,389,728.

[51] Int. Cl.6 .................................................. C08F 8/00
[52] U.S. Cl. .................................. 525/102; 525/103
[58] Field of Search ..................................... 525/102, 103

[56] References Cited

U.S. PATENT DOCUMENTS

| | | | |
|---|---|---|---|
| 3,408,420 | 10/1968 | Wiggill | 260/827 |
| 4,291,136 | 9/1981 | Keogh | 525/102 |
| 5,209,983 | 5/1983 | Case et al. | 525/190 |
| 5,210,150 | 5/1993 | Prejean | 525/329.7 |
| 5,389,728 | 2/1995 | Prejean | 525/102 |

*Primary Examiner*—John C. Bleutge
*Assistant Examiner*—Mark D. Sweet
*Attorney, Agent, or Firm*—Peter A. Fowell

[57] ABSTRACT

Moisture-curable, melt-processible, graft copolymers are obtained by reacting certain direct ethylene copolymers having copolymerized therein a glycidyl containing comonomer, with a specific aminosilane, N-tert-butylaminopropyl trimethoxysilane. The compositions are useful as hot-melt moisture-curable adhesives, as co-extrudable adhesives, and in wire and cable and several other applications.

6 Claims, No Drawings

MOISTURE-CURABLE MELT-PROCESSIBLE ETHYLENE GRAFT COPOLYMERS

CROSS REFERENCE TO RELATED APPLICATION

This application is a continuation-in-part of co-pending application Ser. No.: 08/252,292 filed Jun. 1, 1994 now U.S. Pat. No. 5,389,728 which is a continuation-in-part of application Ser. No.: 08/114,041, filed Aug. 30, 1993, now abandoned.

BACKGROUND OF THE INVENTION

1. Field of the Invention

This invention relates to melt-processible, moisture-curable ethylene copolymers which contain hydrolysable groups. The polymers are prepared by reacting a polymer containing glycidyl groups with a specified amino compound. They are useful, inter alia, as hot-melt adhesives and sealants, coatings, and as components of co-extruded film.

2. Description of Related Art

Crosslinked polymers have many desirable properties such as high heat resistance, good abrasion and cut resistance amongst many more. However, they can not be melt processed. Thermoplastic polymers, on the other hand, have the advantage of ready processibility in the melt. Thermoplastic polymers with a readily crosslinkable unit which may be crosslinked after thermoplastic processing may possess the advantages of both. The crosslinkable units may require additional substances or treatment to achieve effective crosslinking, and/or they may be subject to auto-crosslinking under various conditions such as temperatures higher than their thermoplastic processing temperatures.

A major difficulty with thermoplastic polymers which are potentially crosslinkable can be the prevention of crosslinking during their preparation. Even if this is avoided, a further difficulty can be prevention of even small amounts of crosslinking during the thermoplastic processing, since this leads to low melt flow and lack of control during processing. An alternative is a two-part system, where two polymers react together to crosslink. However, a one-part system has obvious advantages.

Crosslinking reactions during preparation and processing are thus undesirable. The desired crosslinking reaction is that which occurs AFTER thermoplastic processing. If this reaction requires addition of new substances, including a second polymer (i.e. two part systems), catalysts, or treatment other than thermal, such as radiation, to activate or react with the crosslinkable unit, the problem of crosslinking during melt (i.e thermoplastic) processing may not present itself. However, crosslinking systems which involve such substances or treatments are not always the most desirable, and there is a continuing search for thermoplastic crosslinkable polymers which are readily prepared without crosslinking during preparation, are highly melt stable during thermoplastic processing, but are subsequently very readily crosslinkable.

A well known readily crosslinkable unit which has been used in thermoplastic crosslinkable polymers is the silane unit because it can readily crosslink with simple moisture treatment. Such treatment has obvious advantages over radiation crosslinking or treatment with additional substances (other than water). While it is necessary to keep polymers containing such a unit free from moisture conditions which would cause crosslinking before and during thermoplastic processing, keeping polymers dry is a well established procedure. However, ready preparation of polymers containing a controlled level of silane groups where the resulting polymers are also thermally stable (and hence thermoplastically processible) has proved a problem. Often the reactions necessary to incorporate silane groups lead to other moieties which are thermally unstable, or which can themselves activate crosslinking of the silane or other groups.

Commercially, the only one-part, moisture curable hot-melt adhesives on the market are polyurethane based. These materials are currently 'under the gun' however, due to residual isocyanates. In addition, as adhesives they often have poor 'green' strength, often necessitating clamping, as well as poor thermal stability.

Ethylene copolymer based adhesives are in common use. However there are no commercial one-part curable ethylene copolymer based adhesives. Certain silane containing ethylene copolymer based curable materials, useful for adhesives have however been disclosed. U.S. Pat. No. 5,210,150 (Prejean) discloses one method of making fairly melt stable silane containing ethylene copolymer-based, moisture-curable polymers. Here, ethylene copolymers containing a carboxylic acid group are reacted, in the melt, with a stoichiometric amount of an epoxysilane, (a silane containing an epoxide group), the stoichiometric amount being critical in preventing thermal instability.

U.S. Pat. No. 3,408,420 (Wiggill) discloses the reaction used in Prejean, and other reactions where the polymer may contain a vinyl ester or acid chloride group, and is reacted, in solution, with a silane containing an epoxide or secondary amino or secondary alcohol group to produce the silane containing graft polymer.

While the silane containing polymers disclosed in U.S. Pat. No. 5,210,150 referred to above are adequate, still further improvements in preparative ease, melt stability and moisture cure-rate are desirable. There is thus a need for alternative methods of producing melt stable ethylene copolymer-based, thermoplastic silane containing crosslinkable materials, preferably using reactions in the melt.

SUMMARY OF THE INVENTION

The compositions of this invention are graft copolymers which are the reaction products of a direct ethylene copolymer containing epoxide groups and a grafting compound which is a specified secondary aminosilane. The reactive epoxide groups in this case, are in the polymer chain rather than part of the grafting compound. By careful choice of a selected amino compound, a clean graft copolymer is achieved without the epoxide groups themselves polymerizing.

The compositions are melt-processible moisture-curable graft copolymers, comprising the reaction products of
(A) a direct copolymer from monomers comprising:
  (i) ethylene,
  (ii) either (a) from 8 to 40 wt. % of the direct copolymer of vinyl acetate, or (b) from 8 to less than 15 wt. % of the direct copolymer of an alkyl acrylate or methacrylate wherein the alkyl group contains 1–3 carbon atoms, and
  (iii) from 1 to 10 wt. % of the direct copolymer, of a glycidyl containing monomer selected from the group consisting of glycidyl acrylate, glycidyl methacrylate and glycidyl vinyl ether, and (B) from 15 to 150 percent of a stoichiometric amount with respect to the glycidyl moiety, of N-tert-butylaminopropyl trimethoxysilane, the resulting graft copolymers having a melt index of from 1 to 1500.

There is further provided a method of preparing the moisture-curable melt-processible graft copolymers by direct fabrication in the melt, without solvent. Acid catalysts may advantageously be used in the preparation process to enhance the grafting reaction.

DETAILED DESCRIPTION OF THE INVENTION

In this disclosure, the word 'copolymer' with no further qualification is meant to embrace polymers containing two or more than two monomers within it chains as well as grafted copolymers, where further monomers or other compounds are grafted on an existing polymer chain. To distinguish the two type of copolymer the phrase 'direct copolymer' is used to describe the former, and the phrase 'graft-copolymer' for the latter. The graft copolymers of this invention have graft units grafted on direct copolymer chains.

The term epoxide, or epoxide group refers to the group

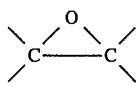

It is sometimes referred to as an epoxy group. The term epoxide ring and oxirane ring is also used to describe the moiety. The term glycidyl is used for the group derived from glycidol or 2,3-epoxy-1-propanol. Thus a glycidyl monomer is an epoxy or epoxide group containing monomer, and a glycidyl group contains an epoxy or epoxide group.

The direct copolymer has within it units derived from a monomer containing an epoxide group, and more specifically a glycidyl group. For convenience, and in accord with common usage, the copolymer is said to 'contain' a glycidyl monomer. The glycidyl monomers are the glycidyl esters of acrylic and methacrylic acid, and also glycidyl vinyl ether. Glycidyl methacrylate is especially preferred. Below 1 wt. %, glycidyl monomer in the copolymer there are insufficient grafting sites to provide sufficient grafting on of the silane. Above about 10 wt. %, control of the grafting reaction, and stability of the resulting graft copolymer can suffer. From 3–9 wt. % of glycidyl monomer is preferred, most preferably from 6–8 wt. %. Higher levels of glycidyl monomer in the copolymer, particularly above about 6 wt. % can provide more rapid grafting of the aminosilane, with lower amounts of grafting catalyst, or even without grafting catalyst at all. When the copolymer contains lower levels of glycidyl monomer it is preferable to use grafting catalysts to speed up the grafting reaction with aminosilanes. This is especially the case in preparations which use equipment which allows relatively short hold-up times, such as an extruder.

The glycidyl group reacts with the secondary amine (amino) group of the aminosilane. It is not essential for a stoichiometric equivalence of glycidyl and amino functionality. In fact there can be an excess of glycidyl functionality by virtue of reacting with less than stoichiometric amounts of aminosilane. An excess of amino functionality by virtue of excess aminosilane is also possible. Excess aminosilane may affect rate of grafting. When an excess is used, it is believed to remain unreacted with the grafted copolymer.

Since a stoichiometric balance of glycidyl and amino functionality is not essential, it is possible to compare materials with constant graft levels, but different glycidyl levels in the polymer. In general, higher graft levels, corresponding to higher glycidyl levels and sufficient aminosilane levels to react with the glycidyl groups, are preferred. But even at constant graft levels, corresponding to a constant level of reactable aminosilane, an excess of (unreacted) glycidyl functionality in the polymer is preferred. This is because, at constant graft level, cure appears to be more rapid with excess glycidyl functionality. This may be related to the statistical distribution of the glycidyl units within a polymer chain. The glycidyl units will be distributed as single units, diads, triads etc. Changing glycidyl level, and changing molecular weight and distribution will affect the relative concentration of these units. Since the glycidyl units are the graft sites, graft site distribution, and hence the distribution of pendant grafted trimethoxysilane units in the grafted copolymer will change. The terminal group of the grafted units, i.e. the methoxysilane units, are the crosslink sites, and hence the distribution of these is directly affected. Cure efficiency depends not just on number of crosslink sites in the polymer, but on their distribution, and hence resulting crosslink distribution, throughout the polymer.

The direct copolymer also contains a 'softening comonomer' which can be vinyl acetate or an alkyl acrylate or methacrylate wherein the alkyl group has one to eight carbon atoms. These monomers are effective both to reduce the stiffness of the direct copolymer and resulting graft copolymer, and to reduce crystallinity of the direct copolymer. Low crystallinity is important in providing a more adhesive polymer, since generally, crystallinity per se can reduce adhesivity in addition to the adverse effect of high stiffness on adhesivity. Crystallinity reduction tends to depend on the molar rather than weight percent of comonomer while stiffness reduction tends to depend on the particular comonomer and its glass transition temperature. Thus low molecular weight softening comonomers will have a greater effect on cryalllinity reduction at a given weight percent. This means, in effect, that lower molecular weight comonomers are effective at a lower weight percent. Thus, while relatively high molecular weight comonomers such as n-butyl acrylate or higher alkyl acrylates may require as much as 15 weight percent comonomer, vinyl acetate and alkyl acrylates or methacrylates with alkyl groups having 1 to 3 carbon atoms will be effective in producing a satisfactory adhesive at levels as low as 8 weight percent. A copolymer containing 11.1 weight percent vinyl acetate was found to be useful as an adhesive. For all softening comonomers, above 40 weight percent in the polymer causes the polymer to become overly soft and difficult to handle. Thus for vinyl acetate, from 8 to 40 weight percent is effective in producing a satisfactory adhesive, and for alkyl acrylates and methacrylates having an alkyl group with from 1–3 carbon atoms, from 8 to less than 15 weight percent is effective. The use of the phrase 'to less than 15 weight percent' means up to but not including 15 weight percent, since 15 weight percent of 1–3 carbon alkyl acrylates or methacrylates is previously disclosed (i.e., these amounts are in addition to the effectiveness of alkyl (meth)acrylates having 1 thru 8 carbon atoms which are already known to be effective at from 15 to 40 weight percent).

Epoxide groups are well known highly reactive groups which often are used for the adhesive potential they impart to a polymer, because of this reactivity. In the present case, the primary function of the epoxide groups of the glycidyl esters or glycidyl vinyl ethers is to provide a reactive graft site. The reaction is believed to be a ring opening of the epoxide ring by reaction with the secondary amine, to produce a tertiary amine, and a hydroxyl group beta to the nitrogen of the amine. When the glycidyl groups are reacted with the corresponding reactive amino compound in substantially stoichiometric equivalence, to produce a graft copolymer, the glycidyl moiety is essentially reacted, and so can not function as an adhesive moiety, even though the final graft copolymer may function as an adhesive. However, when an excess of (i.e. unreacted) glycidyl units are present in the graft copolymer, these units are free to provide additional adhesive potential-in addition, that is, to the adhesion provided by the silane units.

High reactivity of an aminosilane with epoxy groups, is desirable for efficient grafting. However, highly reactive aminosilanes may produce graft copolymers which are themselves reactive. The graft copolymer may prematurely crosslink the silane moiety before such crosslinking is desired (when later moisture cured). In addition, unreacted epoxide groups in the direct or graft copolymer are potentially polymerizable. Reactive aminosilanes may produce graft polymers which contain moieties which can polymerize such unreacted epoxide groups. Any polymerization could again result in crosslinking before the desired (subsequent) moisture induced crosslinking. Use of stoichiometric amounts of the grafting compound with respect to the polymer functional group with which the graft compound reacts is known as an aid in reducing instability in the graft polymer, (as in U.S. Pat. No. 5,210,150, already referred to). However, as noted above, with the present system, with a glycidyl group in the polymer chain, and an amino functionality in the grafting compound, such stoichiometry is no longer essential for stability. Nevertheless, the aminosilane grafting compound is strictly limited, as will be discussed.

It has been found that N-tert-butylaminopropyl trimethoxysilane is well suited as the grafting compound. It reacts moderately well with the epoxide groups while at the same time does not cause, either directly or via graft reaction products, polymerization of the remaining epoxide groups which have not yet reacted with the aminosilane. The reaction takes place without catalysts, but it can be enhanced by use of certain acid catalysts. Many other substituted trimethoxysilanes are not suitable. At first, N-phenylaminopropyl trimethoxysilane appeared to be suitable, if not ideal, but it was subsequently found to be quite unreactive with the glycidyl containing copolymers of this invention. Low levels of acid impurities later found to be present in certain samples of glycidyl containing polymer had, apparently via catalysis, provided sufficient reactivity of the N-phenyl substituted silane. With standard polymer containing no such acid moieties, insufficient reaction occurs. This accidental use of off-standard polymer however, suggested the possibility of acid catalysis to provide reactivity of the highly hindered N-phenyl substituted silane. When acetic acid was tried as catalyst, while reaction occurred to some extent, thermal stability of the grafted or partially grafted polymer was inadequate. Other acid catalysts were sought for the N-phenyl substituted aminosilane. None were found which provided a balance of reactivity and stability in the resultant graft polymer. However, for the N-tert-butyl substituted aminosilane, a catalyst system which includes stearic acid was found to give enhanced reactivity without producing undue instability in the resulting grafted copolymer.

Many N-substituted aminopropyl trimethoxysilanes were tried. All were unsuitable. Most often they were sufficiently reactive, but the resulting grafted polymer was not sufficiently stable. Thus, with N-methyl-, with N-cyclohexyl-, with N-isopropyl- and with N-isobutyl-aminopropyl trimethoxysilanes grafted on to the glycidyl polymer, undesirable crosslinking of the resulting graft copolymer occurs, so that it is not sufficiently melt stable. The N-methyl is by far the most reactive aminosilane with the glycidyl group, but also gives the most unstable resulting graft copolymer. The others, while reactive, produced graft copolymers which were more stable than the N-methyl silane graft copolymer, but still not sufficiently stable, at least for hot-melt adhesive use.

The reason for the N-tert-butylaminopropyl trimethoxysilan's ability to react with glycidyl groups without causing subsequent ring opening polymerization of epoxide rings in remaining glycidyl groups, leading to crosslinking, or without causing other crosslinking reactions, is not known. Without adhering to any particular theory however, it may be related to the N-tert-butyl group of the secondary aminosilane causing the aminosilane to be sufficiently nucleophylic to be reactive with the glycidyl group, without the N-tert-butyl group providing too much steric hindrance for such reactivity, but providing sufficient steric hindrance in the resulting grafted polymer to prevent the grafted polymer initiating subsequent reactions leading crosslinking and hence unstable polymer. Other substituted aminosilanes with comparable reactivity and ability to prevent crosslinking side reactions may be suitable.

To enhance the grafting reaction, certain acid catalysts can be used, but are not essential. As noted above, acetic acid catalyses effectively, but produces unstable graft copolymer. Certain acid catalysts are particularly useful when lower levels of glycidyl functionality are present in the ethylene copolymer, and when reaction time is more limited, as in an extruder. The particular acid catalysts which are useful are hindered carboxylic acids such as stearic acid. Hindered carboxylic acids aid the initial grafting reaction without significantly catalysing any of the possible crosslinking reactions in the resulting graft copolymer. An extensive search for the optimum acid catalyst or catalyst system has not been carried out. However, simple trial and error of various carboxylic acids will allow determination of the balance of its grafting enhancement ability and its destabilizing effect on the resultant graft copolymer. Stearic acid was found to be highly suitable. The additional presence of triphenylphosphine has also been found to be useful.

Preparation of the direct ethylene copolymers is achieved by well known methods for preparing direct ethylene copolymers. These methods typically use a continuous stirred reactor at high temperatures and pressures, as described in U.S. Pat. Nos. 4,351,931 and 3,780,140 which are hereby incorporated by reference. The comonomer mix is different from the various ones described in those references, but feed rates of the different monomers are readily adjusted in a standard manner, to allow for differing levels and reactivities.

A thermal stabilizer is not essential. While the components of the graft copolymer react together in the melt, to produce the graft copolymer without side reactions leading to any significant amount of crosslinking during the reaction time in the melt, extended holdup times in the melt can lead to crosslinking. With N-tert-butylaminopropyl trimethoxysilane no stabilizer is necessary. This is not to say specific 6stabilizers could not lead to improvements in the long term thermal stability of the melt of the graft polymer. Monofunctional substituted carbodiimides may offer some stabilizing effect, particularly if acid catalysts are present. Other potential stabilizers have not been sought, but it is likely that such materials could be found.

The two graft copolymer components, the direct copolymer and the aminosilane, are reacted together in high shear melt mixing equipment such as an extruder equipped with a suitable mixing screw, or other high shear mixers such as a Banbury, Brabender or Haake mixer. Melt temperatures above 110 are used to allow sufficiently rapid reaction without increasing the possibility of undesirable side reactions. Stearic acid and triphenylphosphine may be dissolved in the aminosilane to provide catalysis of the reaction. Amounts of these two materials sufficient to provide about 6000 ppm of each in the graft copolymer have been found ideal with the N-tert-butylaminopropyl trimethoxysilane. An amount sufficient to provide up to 8000 ppm will generally be suitable. Generally, reaction temperatures above 240 deg. C. will not be suitable if mixers are used, but for short hold up times, as in an extruder, temperatures up to 290 deg. C. are acceptable. No solvent is used. Hold up times required for complete reaction are typically about 5 to 15 minutes depending on the temperature, shear and presence or absence of catalyst. While close to stoichiometric amounts of aminosilane and glycidyl moiety is suitable, an aminosilane/glycidyl ratio of from 0.15/1 to 1.5/1 can be used.

The direct copolymers used to prepare the graft copolymers of this invention may have a melt index of from about 1 to 1500. The resulting graft copolymers should have a melt index also from about 1 to 1500. Generally, no major change in viscosity occurs on grafting. The MI of the graft copolymer is usually no lower (viscosity no higher) than that of the direct copolymer, though often it may be up to about 60% higher. Higher melt index graft copolymers are particularly suitable for hot-melt adhesive use. Lower melt-index graft copolymers may be processed by extrusion, and are suitable for co-extruded adhesives and for wire and cable use. Adhesive uses of the moisture-curable graft copolymers of this invention include automotive gaskets, auto interior trim, auto head and tail lamps, furniture assembly including edge banding, small appliances, construction, bookbinding, and general product assembly.

The moisture-curable graft copolymers of this invention are suitable for use alone. For some uses they may also be formulated using art-recognized modifiers such as plasticizers and tackifiers. The use of plasticizers and tackifiers is well known in the adhesives industry.

The graft copolymers can be melt processed between 110 and 220 deg. C. Temperatures in the 130 to 150 deg. C. range are generally suitable for adhesive use, while higher temperatures may be more suitable for resins having low melt index. Higher temperatures may also be more suitable for extrusion coating, where very rapid coating rates are desirable.

Moisture curing is the result of crosslinking the polymer through the alkoxysilane groups. Crosslinking will produce increased strength and modulus. Commonly tin catalysts are added to speed cure of silane systems. With the present system it is not necessary to use tin catalysts. The reason that such catalysts are not required is not understood. The ability to cure without such catalysts is considered to be an advantage. The crosslinking reaction on moisture treatment of the grafted copolymer can occur at as low as 24 deg. C. and 50% relative humidity but occurs considerably more rapidly at 100% relative humidity and temperatures around 70 deg. C.

Test Procedures

In the examples which follow, the preparation of the moisture-curable ethylene graft copolymer is described. The rate of moisture cure, as monitored by viscosity change, and the thermal stability of the graft copolymers is determined. In some instances tensile properties at elevated temperatures and shear and peel adhesion temperatures are determined.

Melt Index (MI) is determined using ASTM D-1238 (2160 g. load/190 deg. C. Values are in units of g/10 min.)

Viscosity stability was measured using a Brookfield viscometer at 135 deg. C. and a shear rate of 0.1 sec-1. The polymer is kept at this temperature in an open cup, and viscosity change continuously monitored. While 135 deg. C. is low compared to the highest feasible melt-processing temperatures, it is a typical melt processing temperature, particularly for adhesives. For adhesives, long hold up times in the melt may be necessary. Hold up times as long as 24 hours at 135 deg. C. may sometimes be used. In the test, a viscosity increase less than 50% over a period of 8 hours is considered an indication of good thermal stability, and sufficient for adhesive use. Such a level of stability also suggest adequate thermal stability at higher temperatures but shorter hold up times such as in typical of extrusion processing.

Heat resistance is measured using the following shear and peel failure tests.

Shear Adhesion Failure Temperature (SAFT) is measured on a 1 square inch bond on thin aluminum foil as the backing, using the standard method of measuring shear adhesion. A 100 g. weight per square inch of bond is used. The sample is placed in an oven at ambient temperature, and temperature increased at a rate of 1 deg. C. per minute, recording the temperature at which the bond fails, (when the weight drops). The test is stopped at 192 deg. C. Failure is essentially cohesive.

Peel Adhesion Failure Temperature (PAFT) is measured on a sample with thin aluminum foil as backing. It is measured in the standard way for peel strength tests, using a 100 g. weight per linear inch. The sample is placed in an oven at ambient temperature, and temperature increased at a rate of 1 deg. C. per minute. Temperature of failure is recorded, at the point the weight drops. The test is stopped at 192 deg. C. Failure is, of course, adhesive rather than cohesive.

Tensile properties are determined using ASTM D-638

Curability-the ease with which the polymer crosslinks with moisture-is determined in the following way. A 70 mil compression molded plaque was prepared using a press temperature of 120 deg. C. and a 5000 pound load. The plaque was place in a humidity chamber kept at 70 deg. C. and 95% relative humidity. After 24 hours, melt index tests are carried out. Low or no flow after this time indicates a good cure rate.

EXAMPLES

Example 1

50 g. of an ethylene/n-butyl acrylate/glycidyl methacrylate direct copolymer containing 25 wt. % n-butyl acrylate and 7.6 wt. % glycidyl methacrylate, and having a melt index of 900, were reacted with 7 g. of N-tert-butylaminopropyl trimethoxysilane in a Brabender batch mixer at 210 deg. C. for ten minutes. Rotor speed was 50 RPM. This represents an 11% excess aminosilane over stoichiometric balance with the epoxide functionality. Melt index of the final graft copolymer product was 1316. This is above that of the direct copolymer which suggests little or no crosslinking during the preparation of the graft copolymer.

Thermal stability of the product was determined. Initial Brookfield viscosity was 35,000 centipoise. Viscosity increased approximately 40% in 8 hours, indicating adequate thermal stability of the melt for hot-melt adhesive use.

Cure tests showed the resin to have no flow after the 24 hour moisture treatment, indicating the efficacy of crosslinking by the moisture.

Example 2

45 g. of an ethylene/n-butyl acrylate/glycidyl methacrylate direct copolymer containing 25 wt. % n-butyl acrylate and 5.6 wt. % of glycidyl methacrylate and having a melt index of 900 were reacted with 4.8 g. of N-tert-butylaminopropyl trimethoxysilane as in Example 1. This was a 15% stoichiometric excess of aminosilane over epoxide functionality. Melt index of the grafted product was 1467, again suggesting little or no crosslinking during preparation.

Cure tests showed that after 24 hours the resin had no flow, indicating good cure. Thermal stability was determined. Initial viscosity was 30,000 cps and increased only 25% in 8 hours, indicating good thermal stability.

Example 3

This example employed a direct copolymer with a relatively low level of glycidyl monomer.

45 g. of ethylene/n-butyl acrylate/glycidyl methacrylate direct copolymer containing 25 wt. % n-butyl acrylate and 4 wt. % glycidyl methacrylate was reacted with 4 g. of N-tert-butylaminopropyl trimethoxysilane as in Example 1, except that the reaction temperature was increased to 230 deg. C. from 210 deg. C. The amount of aminosilane represents a 33% stoichiometric excess. Melt index of the graft copolymer product was 1199.

Cure was determined. Melt Index was 243 after 24 hours and no flow after 48 hours. Thermal stability was also determined. Initial viscosity was 35,000 cps, increasing only 11% in 8 hours.

The relatively low glycidyl monomer level can be seen to slow moisture cure rate, though it is still adequate. Thermal stability however is better than in Example 1.

Example 4

This example uses less than 100% of the stoichiometric amount of arninosilane over glycidyl functionality, but a direct copolymer containing a high amount of glycidyl functionality.

45 g. of a 900 MI ethylene/n-butyl acrylate/glycidyl methacrylate direct copolymer containing 25 wt. % n-butyl acrylate and 7.6 wt. % glycidyl methacrylate was reacted with 2.84 g. of N-tert-butylaminopropyl trimethoxysilane as in Example 1. This represents only 50% of the stoichiometric amount of aminosilane which would be required to equal the amount of glycidyl functionality. Melt Index of the graft copolymer product was 947.

Cure rate tests showed that after 24 hours the resin exhibited no flow indicating excellent cure. Thermal stability tests were carried out. With an initial viscosity of 40,000, 18% increase occurred in 8 hours indicating excellent thermal stability.

In this example, the potential amount of grafting is less than in Example 3. 50% of the amount need to react with 7.6 wt. % glycidyl methacrylate was used so that only 3.8 wt. % of glycidyl methacrylate could have reacted. In Example 3, with an excess of aminosilane, all of the 4.0 g. of glycidyl methacrylate could have reacted, or more than in the present example. Nevertheless, the cure rate was higher than in Example 3. This shows the advantage of a higher level of glycidyl functionality even when the total amount of potential grafting is less.

Example 5

45 g. of the direct copolymer used in Example 3 was reacted with 3.94 g. (30% stoichiometric excess with respect to glycidyl methacrylate) of N-tert-butylaminopropyl trimethoxysilane as in Example 1, except that the reaction time was only 5 minutes compared with 10 minutes for Example 3. Melt index of the graft copolymer was 1168.

Moisture cure tests, carried out exactly as in Example 3, produced less cure than in Example 3, since from a similar initial MI, the cured graft copolymer still had an MI of 372 after 24 hours. Thermal stability was high, the viscosity increasing from 31,000 by only 3% in 8 hours.

This example serves as a control for the next example which utilizes a catalyst system.

Example 6

The direct copolymer of Example 5 was treated with the same amount of the same aminosilane at the same temperature and for the same time, but 0.3 g. of stearic acid and 0.3 g. of triphenylphosphine were added with the reactants, to act as a catalyst. This amounts to about 6000 ppm of each catalyst in the graft copolymer. MI of the graft copolymer was 1210.

Moisture cure rate, determined in the same way, indicated the cured resin had an MI of 5 after 24 hours. This is much lower than in Example 5, indicating far more cure. This, in turn, is presumed to be due to the greater amount of grafting rather than due to any catalysis of the moisture cure reaction.

Comparative Example 1

45 g. of the same direct ethylene copolymer as in Example 1 was reacted with 6.9 g. of N-isopropylaminopropyl trimethoxysilane using the same procedure as in Example 1, except that the temperature was 160 deg. C. instead of 210 deg. C. The amount of aminosilane represents a 30% stoichiometric excess. Melt index of the graft copolymer was 1419.

Cure testing showed that after 24 hours the resin exhibited no flow, representing excellent cure. This suggests facile grafting even at the lower temperature of 160 deg. C. with this aminosilane. However thermal stability was completely unacceptable. The initial viscosity was 26,000 increasing 100% in only 130 minutes. This renders the product unusable for use as a conventional hot-melt adhesive or component of same. An isopropyl group on the aminosilane is unsatisfactory when hot-melt adhesive use is contemplated. For other purposes, the stability might be acceptable.

Comparative Example 2

45 g. of the same direct ethylene copolymer as in Example 1 was reacted with 8.14 g of N-cyclohexylaminopropyl trimethoxysilane, using the same procedure as in Comparative example 1. ( a 30% stoichiometric excess). Melt index of the grafted product was 1443. Cure was excellent, the resin exhibiting no flow after 24 hours, under the same cure conditions. Thermal stability however, again was unacceptable for hot-melt adhesive applications. Viscosity increased from 22,000 by 100% in only 210 minutes. A cyclohexyl group on the aminosilane is unsatisfactory for preparation of graft copolymers suitable for hot-melt adhesives.

Comparative Example 3

45 g. of the direct copolymer of Example 1 was reacted with 7.33 g. of N-isobutylaminopropyl trimethoxysilane using the same conditions as Comparative example 1 (reaction temperature 160 deg. C.). Stoichiometric amine excess was 30%. MI of the resulting graft copolymer was 1529.

Moisture cure rate was high, no flow being observed after 24 hours. Thermal stability, however, was unsatisfactory for hot-melt adhesive use. Initial viscosity of 25,000 doubled in only 140 minutes.

Example 7

This example demonstrates that an extruder is adequate to prepare the graft copolymer. An extrusion represents an extremely economical way to prepare the graft copolymer.

The direct copolymer of Example 1 was reacted with N-tert-butylaminopropyl trimethoxysilane, in a co-rotating twin screw Berstorff extruder having a screw with a length to diameter ratio of 38/1. No solvent was present. The production rate was 5 pph, the temperature 280 deg. C., and the screw rpm was 50. The aminosilane was injected into a mixing zone in the extruder utilizing a syringe pump, at a rate of approximately 0.7 pph which represents 30% stoichiometric excess. MI of the product was 1027.

The grafted polymer moisture cures rapidly, exhibiting no flow after 24 hours.

Tensile properties are good before and after cure. Heat resistance measured under both shear and peel conditions for graft copolymer can be seen to increase dramatically on curing, showing the moisture cured graft copolymer to be excellent as seen from SAFT and PAFT values. Shear Adhesion Failure Temperatures (SAFT) of above 150 deg. C. and Peel Adhesion Failure Temperature (PAFT) above 100 deg. C. are considered excellent. Data are shown in Table 1.

Example 8

This reaction was carried out in an extruder using the same conditions as in Example 7 except for aminosilane feed rate. However the direct copolymer was the one used in Example 2, containing less glycidyl methacrylate, 5.6 wt. %, compared with 7.6 for Example 7. Feed rate of the aminosilane was 0.55 pph which is 130% of the stoichiometric amount required to react with all the glycidyl methacrylate, calculated based on the graft copolymer production rate. MI of the graft copolymer was 730. Cure gave an MI of 129 after 24 hours. This is satisfactory, but considerably slower than in Example 7, showing that when hold up times are short, as in this case where an extruder was used, compared with the longer times in a Brabender mixer, higher glycidyl comonomer levels are preferred, or a catalyst is advantageous as demonstrated in the next example.

Example 9

This example uses ingredients, amounts and conditions identical to the previous example (8), except enough stearic acid and triphenylphosphine were dissolved in the aminosilane to provide a concentration of 4000 ppm of each in the final product, as a catalyst system. MI of the grafted product was 1008.

Moisture cure produced resin with no flow after 24 hours. Presumably the stearic acid and triphenylphosphine act catalytically, enhancing grafting sufficiently to produce a grafted product which cures rapidly, even with lower levels of glycidyl monomer. SAFT and PAFT values are shown in Table 1.

Example 10

This reaction was carried out exactly as described in Example 7, using direct copolymer with 7.6 g. glycidyl methacrylate, but sufficient stearic acid and triphenylphosphine were dissolved in the aminosilane to provide a concentration of 4000 ppm of each in the final graft copolymer.

Moisture cure gave resin with no flow after 24 hours. Tensile properties and SAFT and PAFT were measured and are shown in Table 1. Values are excellent, particularly the cured tensile properties. Thermal stability measured in the standard way was excellent, showing a viscosity increase from its initial value of 38,000, of only 26% in 8 hours.

This example was included to show that an extrusion process using catalyst can produce excellent product, and catalyst does not hurt thermal stability.

Example 11

200 g. of an ethylene/vinyl acetate/glycidyl methacrylate copolymer containing 11.1 wt. % vinyl acetate and 7.4 wt. % glycidyl methacrylate, and having a melt index of 941, was reacted with 12 g. of N-tert-butylaminopropyl trimethoxysilane in a Brabender batch mixer at 225 for 10 minutes. Rotor speed was 100 rpm. A combination of stearic acid and triphenyl phosphine were used to catalyze the reaction. Enough stearic acid and triphenyl phosphine were dissolved in the aminosilane to provide a concentration of 3750 ppm of each in the final product. The molar concentration of the aminosilane was 50%, based on the glycidyl methacrylate content. Melt index of the final product was 947.

The ease with which the grafted polymer cured with moisture was shown by the following. A 70 mil compression molded plaque was prepared using a press temperature of 120 deg. C. and a 5000 lb. load. The plaque was placed in 70 deg. C. water. After 24 hours the melt inded test indicated the resin had no flow.

Thermal stability of the product was tested by measuring viscosity as a function of time, as described above. Initial viscosity was 50400 centipoise. Viscosity increased approximately 75% in 8.4 hours, shoing reasonably good thermal stability for a moisture curable hot melt adhesive.

Tensile properties were as follows. Tensile strength increased from 628 psi. to 951 psi and elongation from 107% to 186% on cure. Thus vinyl acetate is also suitable as a softening monomer in the direct copolymer of the graft copolymer.

TABLE 1

| | TENSILE AND ADHESION PROPERTIES | | | |
|---|---|---|---|---|
| EX. # | TENSILE STRENGTH (PSI) | ELONGATION (%) | SAFT (DEG C.) | PAFT (DEG C.) |
| (UNCURED) | | | | |
| 7 | 169 | 72 | 75 | 42 |
| 9 | 197 | 71 | 76 | 53 |
| 10 | 156 | 62 | 72 | 32 |

TABLE 1-continued

| | TENSILE AND ADHESION PROPERTIES | | | |
|---|---|---|---|---|
| EX. # | TENSILE STRENGTH (PSI) | ELONGA- TION (%) | SAFT (DEG C.) | PAFT (DEG C.) |
| (CURED) | | | | |
| 7 | 255 | 181 | >192 | >192 |
| 9 | 321 | 312 | >192 | >192 |
| 10 | 374 | 253 | >192 | >192 |

I claim:

1. A melt-processible, moisture-curable graft copolymer composition, comprising the reaction product of
   (A) a direct copolymer from monomers comprising:
      (i) ethylene;
      (ii) either (a) from 8 to 40 wt. %, based on the direct copolymer, of vinyl acetate, or (b) from 8 to less than 15 wt. % based on the direct copolymer of an alkyl acrylate or alkyl methacrylate wherein the alkyl group has from 1 to 3 carbon atoms; and
      (iii) from 1 to 10 wt. %, based on the direct copolymer, of a glycidyl containing monomer selected from the group consisting of glycidyl acrylate, glycidyl methacrylate and glycidyl vinyl ether, and
   (B) from 15 to 150 percent of the stoichiometric amount with respect to the glycidyl moiety in the direct copolymer, of N-tert-butylaminopropyl trimethoxysilane, based on its amine functionality, the resulting graft copolymer having a melt index of from 1 to 1500.

2. The composition of claim 1, wherein the direct copolymer is ethylene/vinyl acetate/glycidyl methacrylate.

3. The composition of claim 2, wherein the direct copolymer contains from 3 to 8 wt. % glycidyl methacrylate.

4. The composition of claim 1, which has been crosslinked by treatment with moisture.

5. A process for preparing moisture-curable, melt-processible graft copolymers compositions, comprising:
   mixing in melt mixing equipment, in the absence of solvent, at a temperature above 120 deg. C.
   (A) a direct copolymer from monomers comprising:
      (i) ethylene,
      (ii) either (a) from 8 to 40 wt. % based on the direct copolymer, of vinyl acetate or (b) from 8 to less than 15 wt. % based on the direct copolymer of an alkyl acrylate or methacrylate wherein the alkyl group has from 1–3 carbon atoms; and
      (iii) from 1 to 10 wt. % based on the direct copolymer, of a glycidyl containing monomer selected from the group consisting of glycidyl acrylate, glycidyl methacrylate and glycidyl vinyl ether, and
   (B) from 15 to 150 percent of the stoichiometric amount with respect to the glycidyl moiety, of N-tert-butylaminopropyl trimethoxysilane, wherein the melt index of the resulting melt-processible moisture-curable graft copolymer is from 1 to 1500.

6. The process of claim 5, which process is carried out in the presence of stearic acid and triphenylphosphine, which is dissolved in the N-tert-butylaminopropyl trimethoxysilane, the stearic acid and triphenylphosphine each being present in an amount which provides up to 8000 ppm in the product graft copolymer.

* * * * *